(12) United States Patent
Kil et al.

(10) Patent No.: US 12,469,573 B2
(45) Date of Patent: Nov. 11, 2025

(54) STORAGE CONTROLLER GENERATING READ VOLTAGES FOR SOFT DECISION DECODING BASED ON READ INFORMATION AND DECODING INFORMATION, STORAGE DEVICE INCLUDING THE SAME, AND OPERATING METHOD THEREOF

(71) Applicant: Samsung Electronics Co., Ltd., Suwon-si (KR)

(72) Inventors: YongSung Kil, Suwon-si (KR); Soonyoung Kang, Suwon-si (KR); Hong Rak Son, Suwon-si (KR); Kangseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 18/320,318

(22) Filed: May 19, 2023

(65) Prior Publication Data

US 2024/0079073 A1 Mar. 7, 2024

(30) Foreign Application Priority Data

Sep. 6, 2022 (KR) .......................... 10-2022-0112489

(51) Int. Cl.
*G11C 29/02* (2006.01)
*G11C 11/408* (2006.01)
*G11C 29/52* (2006.01)

(52) U.S. Cl.
CPC ........ *G11C 29/021* (2013.01); *G11C 11/4087* (2013.01); *G11C 29/52* (2013.01)

(58) Field of Classification Search
CPC ......... H03M 13/1575; H03M 13/1108; H03M 13/153; H03M 13/1545; H03M 13/2942; H03M 13/37; H03M 13/6306; H03M 13/2927; H03M 13/2906; H03M 13/1102; H03M 13/152; H03M 13/3784; H03M 13/3707; H03M 13/6502; G06F 11/1012; G06F 11/1044; G06F 11/102;
(Continued)

(56) References Cited

U.S. PATENT DOCUMENTS

| 8,856,621 B2 | 10/2014 | Eun et al. |
| 9,576,671 B2 | 2/2017 | Karakulak et al. |
| 9,639,419 B2 | 5/2017 | Lin et al. |

(Continued)

FOREIGN PATENT DOCUMENTS

KR 102345067 B1 12/2021

*Primary Examiner* — Jerome Leboeuf
(74) *Attorney, Agent, or Firm* — Wolf, Greenfield & Sacks, P.C.

(57) ABSTRACT

Disclosed is a method of operating a storage controller which is configured to communicate with a non-volatile memory device. The method includes receiving count data from the non-volatile memory device, determining a pre-read voltage based on the count data, sending a pre-read request using the pre-read voltage to the non-volatile memory device, receiving pre-read data from the non-volatile memory device responsive to sending the pre-read request, calculating a decoding value corresponding to the pre-read data, and generating read voltage information based on the count data and the decoding value, and the decoding value predicts an error voltage of the pre-read data.

18 Claims, 13 Drawing Sheets

(58) Field of Classification Search
CPC ............. G06F 11/1032; G06F 11/1048; G11C 16/0483; G11C 29/42
See application file for complete search history.

(56) References Cited

U.S. PATENT DOCUMENTS

| | | | |
|---|---|---|---|
| 9,898,363 | B2 | 2/2018 | Kim et al. |
| 10,083,754 | B1 | 9/2018 | Chen et al. |
| 10,521,291 | B2 | 12/2019 | Ha et al. |
| 10,636,495 | B2 | 4/2020 | Chen et al. |
| 10,789,124 | B2 | 9/2020 | Chen et al. |
| 2018/0350441 | A1 | 12/2018 | Kim |
| 2019/0155546 | A1* | 5/2019 | Cai ................. G06F 3/0659 |
| 2019/0198097 | A1* | 6/2019 | Kim ................. G11C 16/34 |
| 2019/0348133 | A1* | 11/2019 | Chen ................. G11C 11/5642 |
| 2020/0159464 | A1 | 5/2020 | Park |
| 2020/0162108 | A1* | 5/2020 | Kim ................. H03M 13/1111 |
| 2021/0202012 | A1* | 7/2021 | Han ................. G11C 16/26 |
| 2022/0051745 | A1 | 2/2022 | You |
| 2022/0051746 | A1 | 2/2022 | Zamir et al. |
| 2022/0180957 | A1 | 6/2022 | Yang et al. |
| 2022/0222139 | A1 | 7/2022 | Shin et al. |

* cited by examiner

FIG. 7

OVT

| PRL | CV1, CV2 | \|CV1-CV2\| |
|---|---|---|
| VL | CV1 < CV2 | > RV1 |
| VC | - | < RV1 |
| VR | CV1 > CV2 | > RV1 |

FIG. 11

| j | PRL | CV1, CV2 | \|CV1-CV2\| | SW | $O_1^{(j)}$ | ... | $O_{2^k-1}^{(j)}$ |
|---|---|---|---|---|---|---|---|
| 1 | VL | CV1 < CV2 | > RV2 | < RV3 | $O_1^{(1)}$ | | $O_{2^k-1}^{(1)}$ |
| 2 | | | | > RV3 | $O_1^{(2)}$ | | $O_{2^k-1}^{(2)}$ |
| 3 | | | < RV2 | < RV3 | $O_1^{(3)}$ | | $O_{2^k-1}^{(3)}$ |
| 4 | | | | > RV3 | $O_1^{(4)}$ | | $O_{2^k-1}^{(4)}$ |
| 5 | VC | CV1 < CV2 | — | < RV3 | $O_1^{(5)}$ | ... | $O_{2^k-1}^{(5)}$ |
| 6 | | | | > RV3 | $O_1^{(6)}$ | | $O_{2^k-1}^{(6)}$ |
| 7 | | CV1 > CV2 | | < RV3 | $O_1^{(7)}$ | | $O_{2^k-1}^{(7)}$ |
| 8 | | | | > RV3 | $O_1^{(8)}$ | | $O_{2^k-1}^{(8)}$ |
| 9 | VR | CV1 > CV2 | > RV2 | < RV3 | $O_1^{(9)}$ | | $O_{2^k-1}^{(9)}$ |
| 10 | | | | > RV3 | $O_1^{(10)}$ | | $O_{2^k-1}^{(10)}$ |
| 11 | | | < RV2 | < RV3 | $O_1^{(11)}$ | | $O_{2^k-1}^{(11)}$ |
| 12 | | | | > RV3 | $O_1^{(12)}$ | | $O_{2^k-1}^{(12)}$ |

OST

STORAGE CONTROLLER GENERATING READ VOLTAGES FOR SOFT DECISION DECODING BASED ON READ INFORMATION AND DECODING INFORMATION, STORAGE DEVICE INCLUDING THE SAME, AND OPERATING METHOD THEREOF

CROSS-REFERENCE TO RELATED APPLICATIONS

This application claims priority under 35 U.S.C. § 119 to Korean Patent Application No. 10-2022-0112489 filed on Sep. 6, 2022, in the Korean Intellectual Property Office, the disclosures of which are incorporated by reference herein in their entireties.

BACKGROUND

Embodiments of the present disclosure described herein relate to a storage controller, and more particularly, relate to a storage controller generating a read voltage for soft decision decoding based on read information and decoding information.

A storage device refers to a device, which stores data under control of a host device, such as a computer, a smartphone, or a smart pad. The storage device includes a device, which stores data on a magnetic disk, such as a hard disk drive (HDD), or a device, which stores data in a semiconductor memory, in particular, a nonvolatile memory, such as a solid state drive (SSD) or a memory card.

The nonvolatile memory includes memory cells configured to store data. To increase the amount of data to be stored in the storage device, ways to increase the number of bits to be stored in each of memory cells are being researched. As the number of bits stored in each of the memory cells increases, the probability that errors occur at data stored in the memory cells may increase.

Read methods capable of recovering original data even when errors occur at data stored in the memory cells are being required to secure the integrity of data stored in the memory cells.

SUMMARY

Embodiments of the present disclosure provide a storage controller generating a read voltage for soft decision decoding based on read information and decoding information.

According to some embodiments, a method of operating a storage controller configured to communicate with a non-volatile memory device includes receiving count data from the non-volatile memory device, determining a pre-read voltage based on the count data, sending a pre-read request using the pre-read voltage to the non-volatile memory device, receiving pre-read data from the non-volatile memory device responsive to sending the pre-read request, calculating a decoding value corresponding to the pre-read data, and generating read voltage information based on the count data and the decoding value, and the decoding value is indicative of an error voltage of the pre-read data.

According to some embodiments, a storage controller includes a cell count management circuit that determines a pre-read voltage based on count data received from a non-volatile memory device, an exponent calculator circuit configured to calculate a decoding value corresponding to pre-read data that is read from the non-volatile memory device by using the pre-read voltage, and a read voltage calculator circuit configured to generate read voltage information based on the count data received from a non-volatile memory device and the decoding value, and the decoding value is indicative of an error voltage of the pre-read data.

According to some embodiments, a method of operating a storage device which includes a non-volatile memory device and a storage controller includes generating count data, by the non-volatile memory device, determining a pre-read voltage based on the count data, by the storage controller, sending a pre-read request using the pre-read voltage to the non-volatile memory device, by the storage controller, sending pre-read data read by the pre-read request to the storage controller, by the non-volatile memory device, calculating a decoding value corresponding to the pre-read data, by the storage controller, and generating read voltage information based on the count data and the decoding value, by the storage controller, and the decoding value is indicative of an error voltage of the pre-read data.

BRIEF DESCRIPTION OF THE DRAWINGS

The above and other objects and features of the present disclosure will become apparent by describing in detail embodiments thereof with reference to the accompanying drawings.

FIG. 7 is a table describing a method for determining a pre-read level, according to some embodiments of the present disclosure.

FIG. 11 is a table describing how to determine an offset, according to some embodiments of the present disclosure.

DETAILED DESCRIPTION

Below, embodiments of the present disclosure will be described in detail and clearly to such an extent that one skilled in the art implements embodiment of the present disclosure easily.

The terms "unit", "module", etc. to be used below and function blocks illustrated in drawings may be implemented in the form of a software component, a hardware component, or a combination thereof. Below, to describe the technical idea of the present disclosure concept clearly, the description associated with the same components will be omitted.

Figure 1:
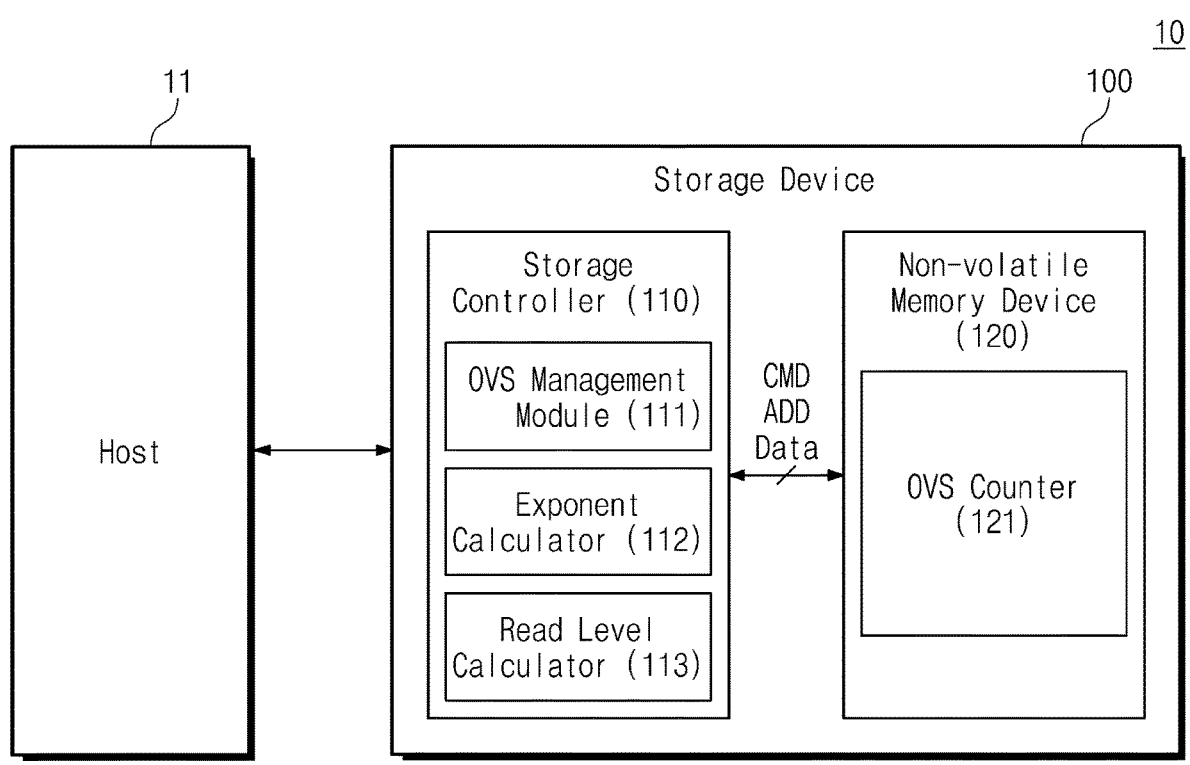
FIG. 1 is a block diagram illustrating a storage system according to some embodiments of the present disclosure.

FIG. 1 is a block diagram of a storage system according to some embodiments of the present disclosure. Referring to FIG. 1, a storage system 10 may include a host 11 and a storage device 100. In some embodiments, the storage system 10 may refer to a computing system, which is configured to process a variety of information, such as a personal computer (PC), a notebook, a laptop, a server, a workstation, a tablet PC, a smartphone, a digital camera, and/or a black box.

The host 11 may control an overall operation of the storage system 10. For example, the host 11 may store data in the storage device 100 or may read data stored in the storage device 100. For example, the host 11 may provide write data to the storage device 100, or the host 11 may request read data stored in the storage device 100.

The storage device 100 may include a storage controller 110 and a non-volatile memory device 120. The non-volatile memory device 120 may store data. The storage controller 110 may store data in the non-volatile memory device 120 or may read data stored in the non-volatile memory device 120. The non-volatile memory device 120 may operate under control of the storage controller 110. For example, based on a command CMD indicating an operation and an address ADD indicating a location of data, the storage controller 110 may store the data in the non-volatile memory device 120 or may read the data stored in the non-volatile memory device 120.

In some embodiments, the non-volatile memory device 120 may be a NAND flash memory device, but the present disclosure is not limited thereto. For example, the non-volatile memory device 120 may be one of various storage devices, which retain data stored therein even though a power is turned off, such as a phase-change random access memory (PRAM), a magnetic random access memory (MRAM), a resistive random access memory (RRAM), and/or a ferroelectric random access memory (FRAM).

The storage controller 110 may include an on-chip valley search (OVS) management module 111 or OVS management circuit, an exponent calculator 112 or exponent calculator circuit, and a read level calculator 113 or a read voltage calculator circuit.

The OVS management module 111 may set a pre-read level based on OVS count data received from a memory area of the non-volatile memory device 120. The memory area may correspond to a group of a plurality of memory cells, such as a memory channel, a memory chip, a memory plane, or a memory block in the non-volatile memory device 120.

The pre-read level may refer to a read level for hard decision decoding. An operation of determining the pre-read level will be described in detail with reference to FIG. 7 together. The process in which data are determined by reading data from a flash memory and performing error correction on the read data may be referred to as "hard decision". The process in which the data are determined by reading data from the flash memory by using different read voltages and performing error correction by using the read data may be referred to as "soft decision".

An OVS counter 121 of the non-volatile memory device 120 may generate OVS count data corresponding to an OVS read operation. The OVS count data may include the number of memory cells included in a range between a plurality of voltage levels. The OVS count data may refer to side data (or by-product data) that are provided to the storage controller 110 in addition to the data obtained by the read operation.

The OVS read operation may refer to an operation of reading data stored in the non-volatile memory device 120 by using a plurality of voltage levels and counting the number of memory cells included in a range between the plurality of voltage levels. The non-volatile memory device 120 may provide the OVS count data to the OVS management module 111 depending on a request of the storage controller 110.

The exponent calculator 112 may generate a syndrome weight (SW) value based on the pre-read data read through the read operation using the pre-read level. The SW value may be used to determine an error bit level of the read data. For example, as the SW value increases, the number of error bits of the read data may increase. The SW value may correspond to whether the decoding of the read data succeeds. This will be described in detail with reference to FIGS. 10A and 10B.

The read level calculator 113 or read voltage calculator circuit may generate read voltage information for soft decision decoding. The read level calculator 113 may determine an offset set based on the OVS count data and the SW value and may generate the read voltage information based on the determined offset set and the pre-read level. The read voltage information may include ($2^k-1$) read levels for soft decision decoding. Herein, "k" is a natural number greater than 1. The offset set may include a plurality of offsets. The offset may refer to a difference (or distance) between the pre-read level used for hard decision decoding and read levels used for soft decision decoding.

The read level calculator 113 determines the offset set based on the OVS count data indicating a distribution of threshold voltages of memory cells and the SW value corresponding to the degree (or probability) of decoding success. That is, the read level calculator 113 may adaptively determine the offset by using the pre-read level used for hard decision decoding and the SW value obtained in hard decision decoding.

The read level calculator 113 may generate the read voltage information adaptively corresponding to states of memory cells by generating the read voltage information based on the determined offset set and the pre-read level. As such, the storage device 100 may have improved reliability.

The storage device 100 may perform the read operation based on the read voltage information. In some embodiments, the read operation may refer to a k-bit read operation for reading one bit by using "k" bits. For example, when the storage device 100 performs a 2-bit read operation, the storage device 100 may read one bit by using two bits. In the k-bit read operation, the storage device 100 may use ($2^k-1$) read voltages for the purpose of identifying states of memory cells. The storage device 100 may perform ($2^k$–1) read processes by using the ($2^k$–1) read levels (or read voltages).

The non-volatile memory device 120 may include the OVS counter 121. The OVS counter 121 may generate the OVS count data corresponding to the OVS read operation.

According to some embodiments of the present disclosure, the storage controller 110 may determine the read voltage information for soft decision based on the OVS count data and the SW value. Because the storage controller 110 determines the read voltage information based on the OVS count data and the SW value, the storage controller 110 may determine the read voltage information with high accuracy compared to an existing storage controller. Accordingly, the reliability of the storage device 100 may be improved. Also, the latency necessary to generate the read voltage information may be minimized.

Figure 2:
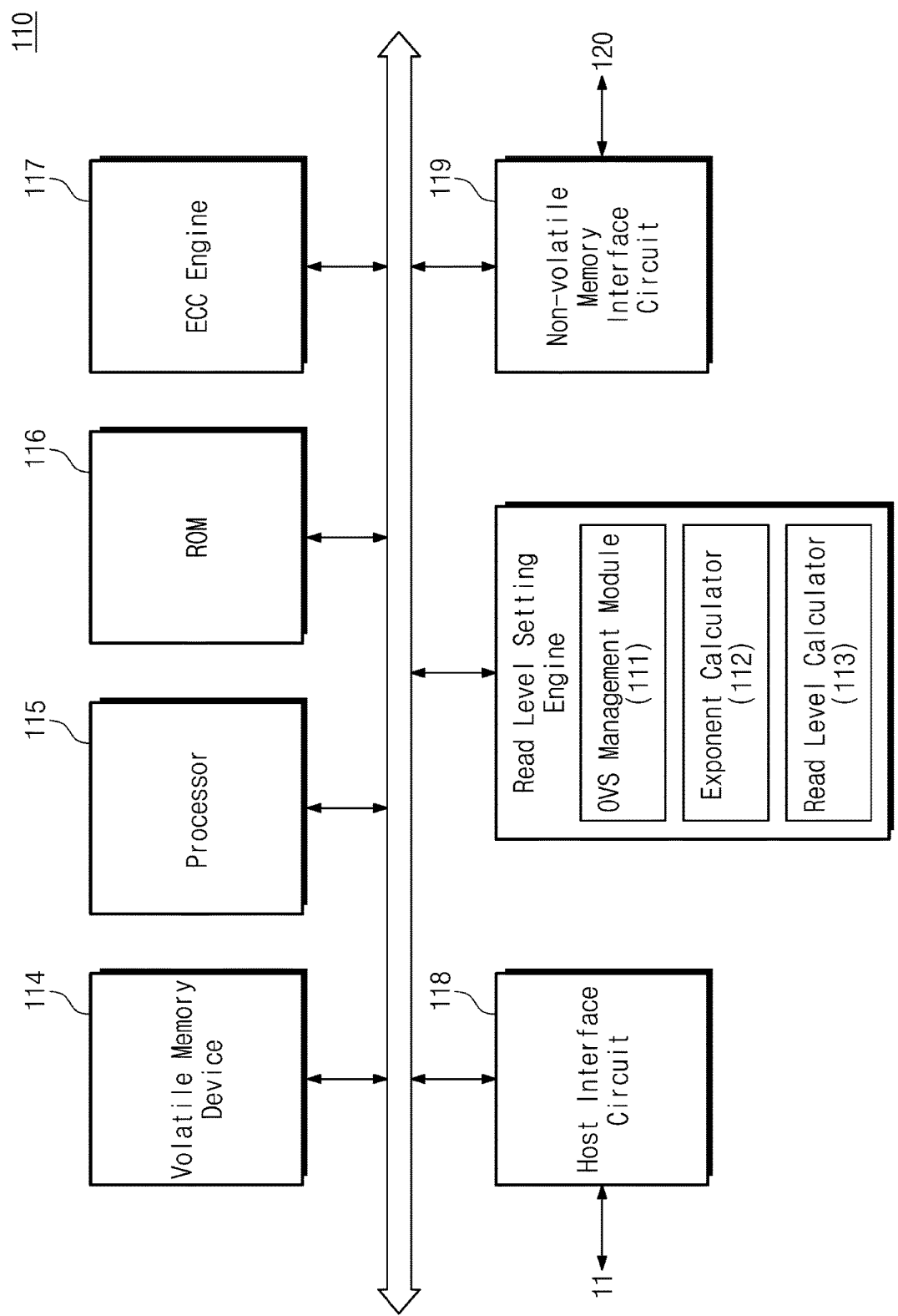
FIG. 2 is a block diagram illustrating a storage controller of FIG. 1 in detail, according to some embodiments of the present disclosure.

FIG. 2 is a block diagram illustrating a storage controller of FIG. 1 in detail, according to some embodiments of the present disclosure. Referring to FIGS. 1 and 2, the storage controller 110 may communicate with the host 11 and the non-volatile memory device 120.

The storage controller 110 may include the OVS management module 111 or OVS management circuit, the exponent calculator 112 or exponent calculator circuit, the read level calculator 113 or read voltage calculator circuit, a volatile memory device 114, a processor 115, a read only memory (ROM) 116, an error correcting code (ECC) engine 117, a host interface circuit 118, and a non-volatile memory interface circuit 119.

The OVS management module 111, the exponent calculator 112, and the read level calculator 113 may be referred to as a "read level setting engine". The read level setting engine may set a read level for the non-volatile memory device 120. The OVS management module 111, the exponent calculator 112, and the read level calculator 113 may respectively correspond to the OVS management module 111, the exponent calculator 112, and the read level calculator 113 of FIG. 1.

In some embodiments, the read level setting engine may be implemented by firmware. For example, the non-volatile memory device 120 may store instructions corresponding to the read level setting engine. The processor 115 may load the instructions of the non-volatile memory device 120 to the volatile memory device 114. The processor 115 may execute the read level setting engine by executing the loaded instructions.

The volatile memory device 114 may be used as a main memory, a cache memory, or a working memory of the storage controller 110. For example, the volatile memory device 114 may be implemented with a static random access memory (SRAM) or a dynamic random access memory (DRAM).

The processor 115 may control an overall operation of the storage controller 110. The ROM 116 may be used as a read only memory that stores information necessary for the operation of the storage controller 110. The ECC engine 117 may detect and correct an error of data read from the non-volatile memory device 120. For example, the ECC engine 117 may have an error correction capability of a given level. The ECC engine 117 may process data having an error level (e.g., the number of flipped bits) exceeding the error correction capability as an uncorrectable data.

The storage controller 110 may communicate with the host 11 through the host interface circuit 118. In some embodiments, the host interface circuit 118 may be implemented based on at least one of various interfaces such as a serial ATA (SATA) interface, a peripheral component interconnect express (PCIe) interface, a serial attached SCSI (SAS) interface, a nonvolatile memory express (NVMe) interface, and an universal flash storage (UFS) interface.

The storage controller 110 may communicate with the non-volatile memory device 120 through the non-volatile memory interface circuit 119. In some embodiments, the non-volatile memory interface circuit 119 may be implemented based on a NAND interface.

Figure 3:
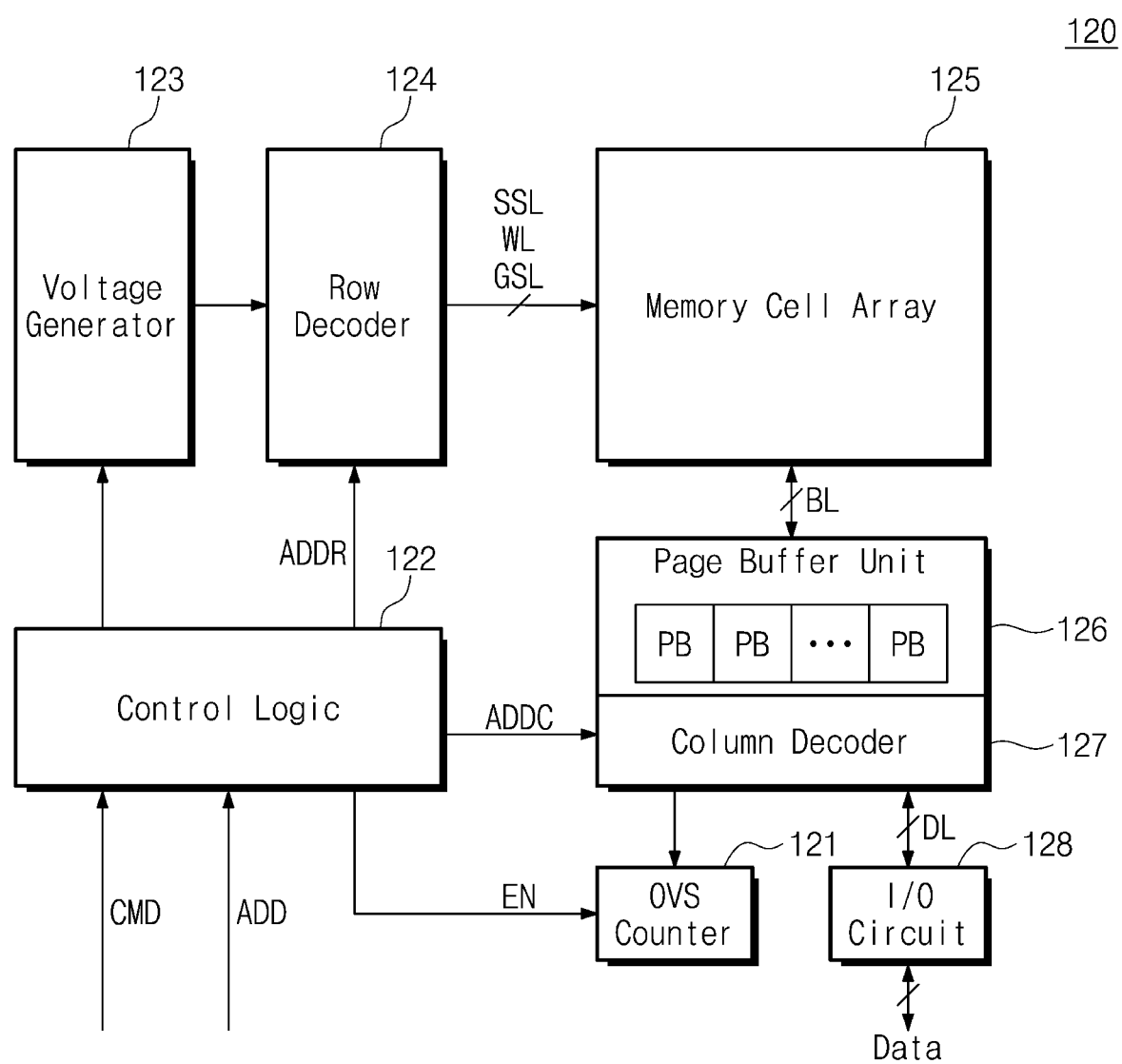
FIG. 3 is a block diagram illustrating a non-volatile memory device of FIG. 1 in detail, according to some embodiments of the present disclosure.
Figure 4:
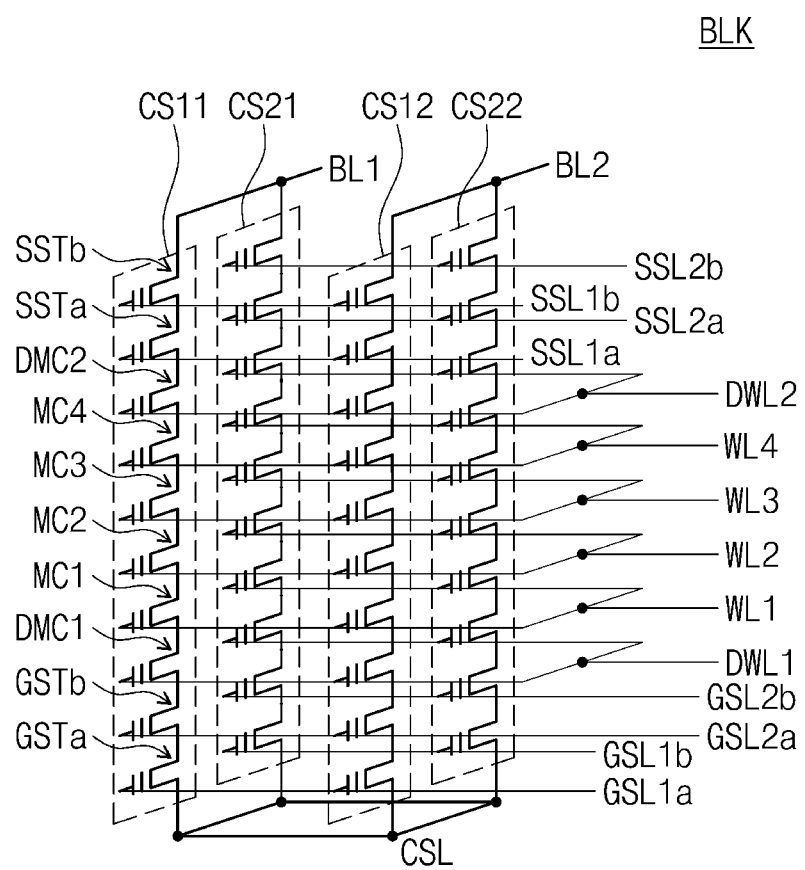
FIG. 4 is a diagram describing a memory block of a memory cell array of FIG. 3, according to some embodiments of the present disclosure.

FIG. 3 is a block diagram illustrating a non-volatile memory device of FIG. 1 in detail, according to some embodiments of the present disclosure. FIG. 4 is a diagram describing a memory block of a memory cell array of FIG. 3, according to some embodiments of the present disclosure. Referring to FIGS. 1, 3, and 4, the non-volatile memory device 120 may communicate with the storage controller 110. For example, the non-volatile memory device 120 may receive the address ADD and the command CMD from the storage controller 110. The non-volatile memory device 120 may exchange data with the storage controller 110.

The non-volatile memory device 120 may include the OVS counter 121, control logic 122, a voltage generator 123, a row decoder 124, a memory cell array 125, a page buffer unit 126, a column decoder 127, and an input/output (I/O) circuit 128. The OVS counter 121 is similar to the OVS counter 121 of FIG. 1, and thus, additional description will be omitted to avoid redundancy.

The control logic 122 may receive the command CMD and the address ADD from the storage controller 110. The command CMD may refer to a signal indicating an operation to be performed by the non-volatile memory device 120, such as a read operation, a write operation, or an erase operation. The address ADD may include a row address ADDR and a column address ADDC. The control logic 122 may control an overall operation of the non-volatile memory device 120 based on the command CMD and the address ADD. The control logic 122 may generate the row address ADDR and the column address ADDC based on the address ADD.

In some embodiments, the control logic 122 may manage the command CMD including the OVS read request. For example, the command CMD may include the OVS read request. The control logic 122 may generate an enable signal EN based on the command CMD. The control logic 122 may control the OVS counter 121 based on the enable signal EN, so as to generate OVS count data.

In some embodiments, the control logic 122 may manage the command CMD including a request for the OVS count data. For example, based on the command CMD including the request for the OVS count data, the control logic 122 may allow the OVS counter 121 to provide the OVS count data to the storage controller 110 through the I/O circuit 128.

Under control of the control logic 122, the voltage generator 123 may control voltages to be applied to the memory cell array 125 through the row decoder 124.

The row decoder 124 may receive the row address ADDR from the control logic 122. The row decoder 124 may be connected with the memory cell array 125 through string selection lines SSL, word lines WL, and ground selection lines GSL. The row decoder 124 may decode the row address ADDR and may control voltages to be applied to the string selection lines SSL, the word lines WL, and the ground selection lines GSL based on a decoding result and a voltage(s) received from the voltage generator 123.

The memory cell array 125 may include a plurality of memory blocks BLK. Each of the plurality of memory blocks BLK may be similar in structure to a memory block BLK illustrated in FIG. 4. The memory block BLK illustrated in FIG. 4 may correspond to a physical erase unit of the non-volatile memory device 120, but the present disclosure is not limited thereto. For example, the physical erase unit may be changed to a page unit, a word line unit, a sub-block unit, or the like.

As illustrated in FIG. 4, the memory block BLK may include a plurality of cell strings CS11, CS12, CS21, and CS22. The plurality of cell strings CS11, CS12, CS21, and CS22 may be arranged in a row direction and/or a column direction. For brevity of drawing, 4 cell strings CS11, CS12, CS21, and CS22 are illustrated in FIG. 4, but the present disclosure is not limited thereto. For example, the number of cell strings may increase or decrease in the row direction or the column direction.

Cell strings placed at the same column from among the plurality of cell strings CS11, CS12, CS21, and CS22 may be connected with the same bit line. For example, the cell strings CS11 and CS21 may be connected with a first bit line BL1, and the cell strings CS12 and CS22 may be connected with a second bit line BL2. Each of the plurality of cell strings CS11, CS12, CS21, and CS22 may include a plurality of cell transistors. Each of the plurality of cell transistors may be implemented with a charge trap flash (CTF) memory cell. The plurality of cell transistors may be stacked in a height direction or vertical that is in a direction perpendicular to a plane (e.g., a semiconductor substrate (not illustrated)) defined by the row direction and the column direction.

The plurality of cell transistors may be connected in series between a corresponding bit line (e.g., BL1 or BL2) and a common source line CSL. For example, the plurality of cell transistors may include string selection transistors SSTa and SSTb, dummy memory cells DMC1 and DMC2, memory cells MC1 to MC4, and ground selection transistors GSTa and GSTb. The serially-connected string selection transistors SSTa and SSTb may be provided between the serially-connected memory cells MC1 to MC4 and the corresponding bit line (e.g., BL1 and BL2). The serially-connected ground selection transistors GSTa and GSTb may be provided between the serially-connected memory cells MC1 to MC4 and the common source line CSL.

In some embodiments, the second dummy memory cell DMC2 may be provided between the serially-connected string selection transistors SSTa and SSTb and the serially-connected memory cells MC1 to MC4, and the first dummy memory cell DMC1 may be provided between the serially-connected memory cells MC1 to MC4 and the serially-connected ground selection transistors GSTa and GSTb.

Memory cells placed at the same height or distance from among the memory cells MC1 to MC4 of the plurality of cell strings CS11, CS12, CS21, and CS22 may share the same word line. For example, the first memory cells MC1 of the plurality of cell strings CS11, CS12, CS21, and CS22 may be placed at the same height or distance from the semiconductor substrate (not illustrated) and may share a first word line WL1. The second memory cells MC2 of the plurality of cell strings CS11, CS12, CS21, and CS22 may be placed at the same height or distance from the semiconductor substrate (not illustrated) and may share a second word line WL2. Likewise, the third memory cells MC3 of the plurality of cell strings CS11, CS12, CS21, and CS22 may be placed at the same height or distance from the semiconductor substrate (not illustrated) and may share a third word line WL3, and the fourth memory cells MC4 of the plurality of cell strings CS11, CS12, CS21, and CS22 may be placed at the same height or distance from the semiconductor substrate (not illustrated) and may share a fourth word line WL4.

Dummy memory cells placed at the same height or distance from among the dummy memory cells DMC1 and DMC2 of the plurality of cell strings CS11, CS12, CS21, and CS22 may share the same dummy word line. For example, the first dummy memory cells DMC1 of the plurality of cell strings CS11, CS12, CS21, and CS22 may share a first dummy word line DWL1, and the second dummy memory cells DMC2 of the plurality of cell strings CS11, CS12, CS21, and CS22 may share a second dummy word line DWL2.

String selection transistors placed at the same height or distance and in the same row from among the string selection transistors SSTa and SSTb of the plurality of cell strings CS11, CS12, CS21, and CS22 may be connected with the same string selection line. For example, the string selection transistors SSTb of the cell strings CS11 and CS12 may be connected with a string selection line SSL1b, and the string selection transistors SSTa of the cell strings CS11 and CS12 may be connected with a string selection line SSL1a. The string selection transistors SSTb of the cell strings CS21 and CS22 may be connected with a string selection line SSL2b, and the string selection transistors SSTa of the cell strings CS21 and CS22 may be connected with a string selection line SSL2a.

Ground selection transistors placed at the same height or distance and the same row from among the ground selection transistors GSTa and GSTb of the plurality of cell strings CS11, CS12, CS21, and CS22 may be connected with the same ground selection line. For example, the ground selection transistors GSTb of the cell strings CS11 and CS12 may be connected with a ground selection line GSL1b, and the ground selection transistors GSTa of the cell strings CS11 and CS12 may be connected with a ground selection line GSL1a. The ground selection transistors GSTb of the cell strings CS21 and CS22 may be connected with a ground selection line GSL2b, and the ground selection transistors GSTa of the cell strings CS21 and CS22 may be connected with a ground selection line GSL2a.

In some embodiments, the memory block BLK illustrated in FIG. 4 is an example. For example, the number of cell strings may increase or decrease, and the number of rows of cell strings and the number of columns of cell strings may increase or decrease depending on the number of cell strings. Also, in the memory block BLK, the number of cell transistors may increase or decrease, the height or distance of the memory block BLK may increase or decrease depending on the number of cell transistors, and the number of lines connected with the cell transistors may increase or decrease depending on the number of cell transistors.

In some embodiments, the memory block BLK may include a plurality of memory pages. For example, the first memory cells MC1 of the cell strings CS11, CS12, CS21, and CS22 connected with the first word line WL1 may be referred to as a "first physical page". In some embodiments, one physical page may correspond to a plurality of logical pages. For example, in the case where a memory cell is a triple level cell (TLC) storing information corresponding to 3 bits, a physical page may correspond to 3 logical pages.

Referring again to FIGS. 1 and 3, the page buffer unit 126 may include a plurality of page buffers PB. The page buffer unit 126 may be connected with the memory cell array 125 through the bit lines BL. The page buffer unit 126 may read data from the memory cell array 125 in units of page, by sensing voltages of the bit lines BL.

The column decoder 127 may receive the column address ADDC from the control logic 122. The column decoder 127 may decode the column address ADDC and may provide the data read by the page buffer unit 126 to the I/O circuit 128 based on a decoding result.

The column decoder 127 may receive data from the I/O circuit 128 through data lines DL. The column decoder 127 may receive the column address ADDC from the control logic 122. The column decoder 127 may decode the column address ADDC and may provide the data received from the I/O circuit 128 to the page buffer unit 126 based on a decoding result. The page buffer unit 126 may store the data provided from the I/O circuit 128 in the memory cell array 125 through the bit lines BL in units of page.

The I/O circuit 128 may be connected with the column decoder 127 through the data lines DL. The I/O circuit 128 may provide data received from the storage controller 110 to the column decoder 127 through the data lines DL. The I/O circuit 128 may output data received through the data lines DL to the storage controller 110.

In some embodiments, the address ADD, the command CMD, and the data described with reference to FIG. 4 may be transmitted/received through the non-volatile memory interface circuit 119 of the storage controller 110 of FIG. 2.

Figure 5:
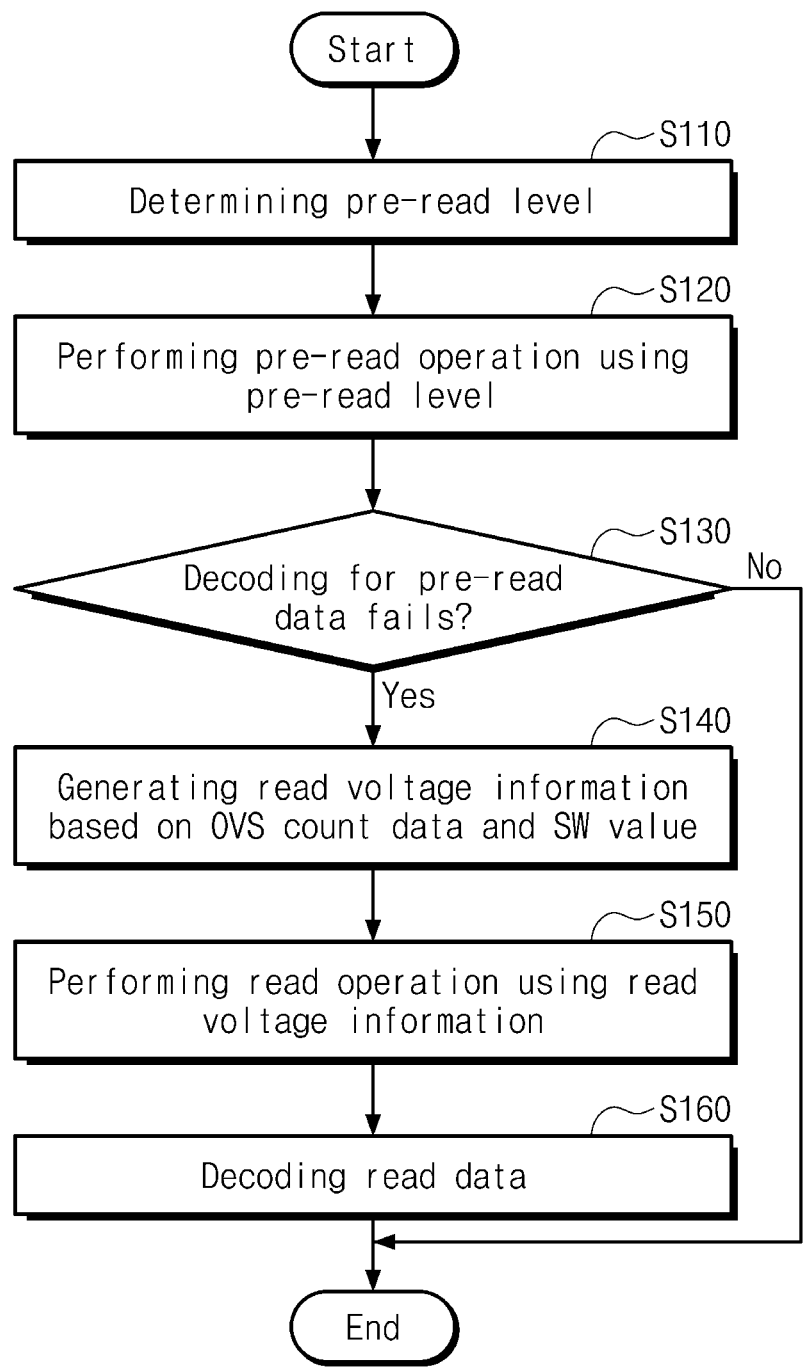
FIG. 5 is a flowchart describing an operating method of a storage device according to some embodiments of the present disclosure.

FIG. 5 is a flowchart describing an operating method of a storage device according to some embodiments of the present disclosure. An operation in which the storage device 100 determines a pre-read level for hard decision decoding and a read level for soft decision decoding will be described with reference to FIGS. 1 and 5.

In operation S110, the storage device 100 may determine the pre-read level for hard decision decoding. In some embodiments, the storage device 100 may generate the OVS count data through the OVS read operation. The storage device 100 may determine the pre-read level based on the OVS count data.

In operation S120, the storage device 100 may perform the pre-read operation by using the pre-read level. The storage device 100 may read data stored in the non-volatile memory device 120 by using the pre-read level.

In operation S130, the storage device 100 may decode the pre-read data read through the pre-read operation. In some embodiments, the storage device 100 may perform hard decision decoding on the pre-read data. In some embodiments, the storage device 100 may perform low density parity check (LDPC) decoding on the pre-read data.

When the decoding succeeds, the storage device 100 may determine that the error correction for the pre-read data succeeds and may not perform the operation for determining the read level for soft decision decoding. When the decoding fails, the storage device 100 may determine that the error correction for the pre-read data fails and may perform operation S140 to perform the operation for determining the read level for soft decision decoding. In some embodiments, the storage device 100 may calculate the SW value corresponding to the pre-read data during the hard decision decoding for the pre-read data.

In operation S140, the storage device 100 may generate the read voltage information for soft decision decoding based on the OVS count and the SW value. In operation S150, the storage device 100 may perform the read operation by using the read voltage information.

In operation S160, the storage device 100 may decode the read data read based on the read operation. In some embodiments, the storage device 100 may perform soft decision decoding on the read data. When the decoding succeeds, the storage device 100 may determine that the error correction for the read data succeeds. When the decoding fails, the storage device 100 may determine that the error correction for the read data fails. In some embodiments, when it is determined that the error correction for the read data fails, the storage device 100 may perform a read-retry operation using an existing defense code.

Figure 6:
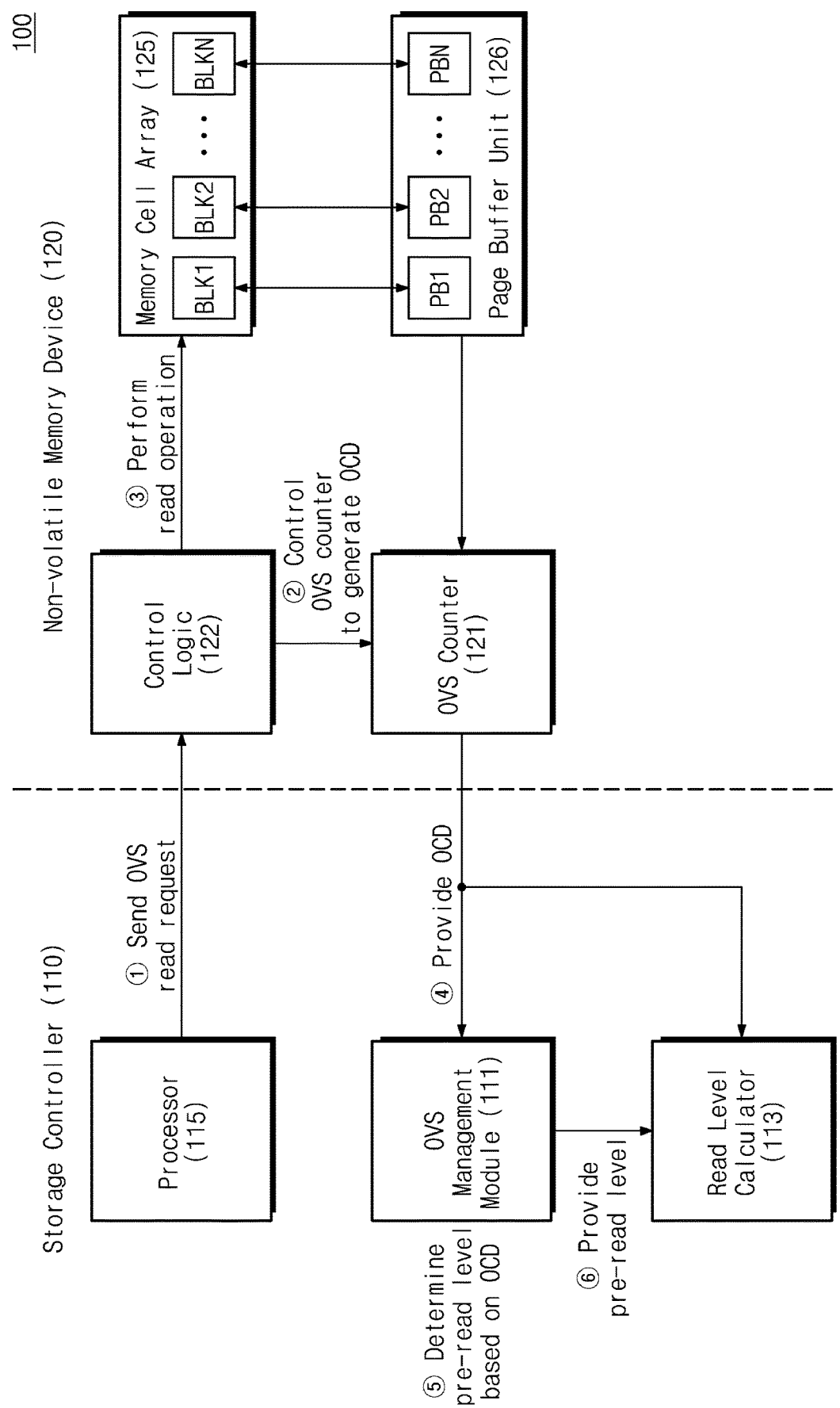
FIG. 6 is a diagram describing an OVS read operation of a storage device according to some embodiments of the present disclosure.

FIG. 6 is a diagram describing an OVS read operation of a storage device according to some embodiments of the present disclosure. Referring to FIG. 6, the storage device 100 may include the storage controller 110 and the non-volatile memory device 120.

The storage controller 110 may include the OVS management module 111, the read level calculator 113, and the processor 115. The OVS management module 111, the read level calculator 113, and the processor 115 may respectively correspond to the OVS management module 111, the read level calculator 113, and the processor 115 of FIG. 2.

The non-volatile memory device 120 may include the OVS counter 121, the control logic 122, the memory cell array 125, and the page buffer unit 126. The OVS counter 121, the control logic 122, the memory cell array 125, and the page buffer unit 126 may respectively correspond to OVS counter 121, the control logic 122, the memory cell array 125, and the page buffer unit 126 of FIG. 3.

Below, the OVS read operation of the storage device 100 according to some embodiments of the present disclosure will be described. For convenience of description and for brevity of drawing, unnecessary components are omitted.

In a first operation ①, the processor 115 may request the OVS read operation from the control logic 122. The OVS read request may direct an operation for reading data stored in the memory cell array 125 and generating OVS count data OCD corresponding to the read data. The example in which the processor 115 requests the OVS read operation from the control logic 122 is described, but the present disclosure is not limited thereto. For example, the OVS management module 111 may request the OVS read operation from the control logic 122.

In a second operation ②, based on the command in the first operation 1, the control logic 122 may allow the OVS counter 121 to generate the OVS count data corresponding to the OVS read operation.

In a third operation ③, the control logic 122 may perform the read operation based on the command in the first operation ①. In this case, the read operation may refer to the operation of reading data stored in the memory cell array 125. The data read by the read operation may be used for the OVS counter 121 to generate the OVS count data OCD.

For example, under control of the control logic 122, data stored in memory blocks BLK1 to BLKN of the memory cell array 125 may be provided to the page buffer unit 126 in units of page. Page buffers PB1 to PBN of the page buffer unit 126 may store the data of the memory blocks BLK1 to BLKN. While the read operation according to the third operation ③ is performed, the OVS counter 121 may generate the OVS count data OCD with reference to the page buffer unit 126.

The OVS count data OCD may include a first count value and a second count value. The first count value may refer to a value that is obtained by counting the number of memory cells whose threshold voltages are between a first voltage level and a second voltage level. The second count value may refer to a value that is obtained by counting the number of memory cells whose threshold voltages are between the second voltage level and a third voltage level. In some embodiments, the second voltage level may be higher than the first voltage level, and the third voltage level may be higher than the second voltage level. In some embodiments, a difference between the first voltage level and the second voltage level may be identical to a difference between the second voltage level and the third voltage level. The first to third voltage levels may be randomly set by the user.

In a fourth operation ④, the OVS counter 121 may provide the OVS count data OCD to the OVS management module 111 and the read level calculator 113. An example in which the OVS counter 121 substantially simultaneously provides the OVS count data OCD to the OVS management module 111 and the read level calculator 113 is illustrated, but the present disclosure is not limited thereto. For example, the OVS counter 121 may provide the OVS count data OCD to the OVS management module 111 and may then provide the OVS count data OCD to the read level calculator 113. Also, the OVS management module 111 may transfer the OVS count data OCD provided from the OVS counter 121 to the read level calculator 113.

In a fifth operation ⑤, the OVS management module 111 may determine the pre-read level based on the OVS count data OCD. This will be described in more detail with reference to FIG. 7.

In a sixth operation 6, the OVS management module 111 may provide the pre-read level to the read level calculator 113.

FIG. 7 is a table describing a method for determining a pre-read level, according to some embodiments of the present disclosure. Referring to FIGS. 2 and 7, a table OVT describing an operation in which the OVS management module 111 determines the pre-read level is illustrated.

Referring to the table OVT, when a first count value CV1 is smaller than a second count value CV2 and when a difference between the first count value CV1 and the second count value CV2 is greater than a first reference value RV1, the OVS management module 111 may determine a first voltage level VL as a pre-read level PRL. This will be described in detail with reference to FIG. 8A together.

Referring to the table OVT, when the difference between the first count value CV1 and the second count value CV2 is smaller than the first reference value RV1, the OVS management module 111 may determine a second voltage level VC as the pre-read level PRL. This will be described in detail with reference to FIG. 8B together.

Referring to the table OVT, when the first count value CV1 is greater than the second count value CV2 and when the difference between the first count value CV1 and the second count value CV2 is greater than the first reference value RV1, the OVS management module 111 may determine a third voltage level VR as the pre-read level PRL. This will be described in detail with reference to FIG. 8C together.

The case where the first count value CV1 and the second count value CV2 are equal to each other is not illustrated in FIG. 7. According to some embodiments, when the first count value CV1 is greater than or equal to the second count value CV2 and when the difference between the first count value CV1 and the second count value CV2 is smaller than the first reference value RV1, the OVS management module 111 may determine the second voltage level VC as the pre-read level PRL. When the first count value CV1 is greater than or equal to the second count value CV2 and when the difference between the first count value CV1 and the second count value CV2 is greater than the first reference value RV1, the OVS management module 111 may determine the third voltage level VR as the pre-read level PRL.

Also, the case where the difference between the first count value CV1 and the second count value CV2 is equal to the first count value CV1 is not illustrated in FIG. 7. According to some embodiments, when the first count value CV1 is greater than or equal to the second count value CV2 and when the difference between the first count value CV1 and the second count value CV2 is greater than or equal to the first reference value RV1, the OVS management module 111 may determine the third voltage level VR as the pre-read level PRL.

Figure 8A:
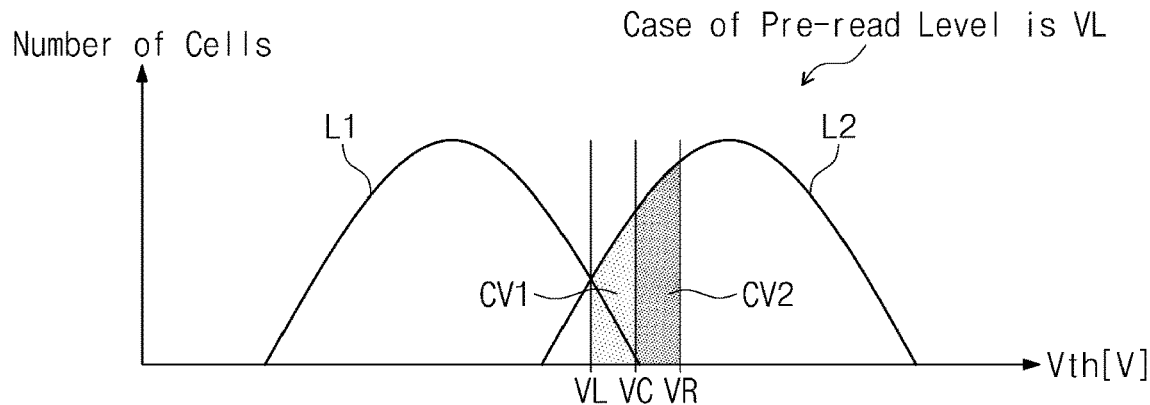
FIG. 8A is a graph describing an operation in which an OVS management module determines a first voltage level as a pre-read level, according to some embodiments of the present disclosure.

FIG. 8A is a graph describing an operation in which an OVS management module or circuit determines a first voltage level as a pre-read level, according to some embodiments of the present disclosure. The first count value CV1 and the second count value CV2 are illustrated in FIG. 8A.

In a graph indicating a threshold voltage level distribution, a horizontal axis represents a threshold voltage level, and a vertical axis represents the number of memory cells. A first line L1 may correspond to memory cells that are not programmed in a write operation and have the erase state "E". A second line L2 may correspond to memory cells that are programmed to have the program state "P" in the write operation.

The OVS count data OCD may include the first count value CV1 and the second count value CV2. The first count value CV1 may refer to a value that is obtained by counting the number of memory cells whose threshold voltages are between the first voltage level VL and the second voltage level VC. The second count value may refer to a value that is obtained by counting the number of memory cells whose threshold voltages are between the second voltage level VC and the third voltage level VR.

When the first count value CV1 is smaller than the second count value CV2 (i.e., when CV1<CV2) and when the difference between the first count value CV1 and the second count value CV2 is greater than the first reference value RV1 (i.e., when |CV1−CV2|>RV1), the OVS management module 111 may determine the first voltage level VL as the pre-read level.

Figure 8B:
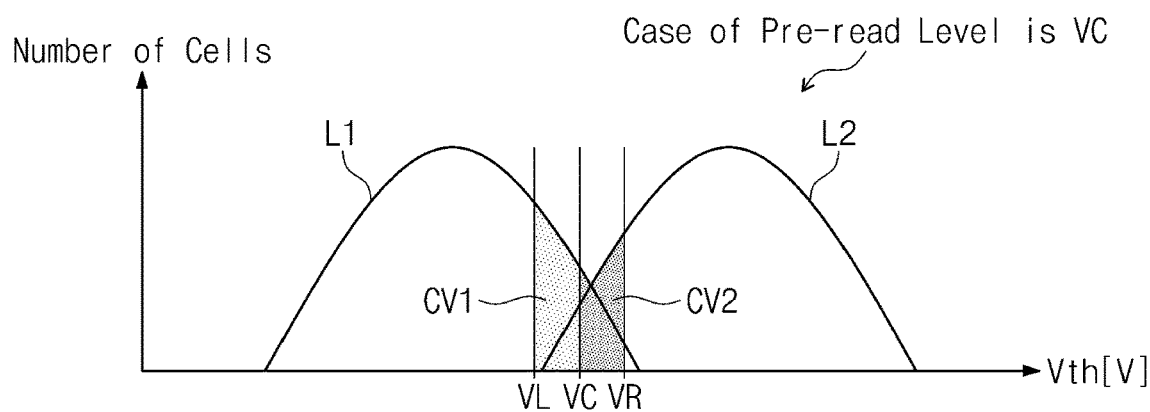
FIG. 8B is a graph describing an operation in which an OVS management module determines a second voltage level as a pre-read level, according to some embodiments of the present disclosure.

FIG. 8B is a graph describing an operation in which an OVS management module or circuit determines a second voltage level as a pre-read level, according to some embodiments of the present disclosure. The first count value CV1 and the second count value CV2 are illustrated in FIG. 8B.

In a graph indicating a threshold voltage level distribution, a horizontal axis represents a threshold voltage level, and a vertical axis represents the number of memory cells. A first line L1 may correspond to memory cells that are not programmed in the write operation and have the erase state "E". A second line L2 may correspond to memory cells that are programmed to have the program state "P" in the write operation.

When the difference between the first count value CV1 and the second count value CV2 is smaller than the first reference value RV1 (i.e., when |CV1−CV21<RV1), the OVS management module 111 may determine the second voltage level VC as the pre-read level.

Figure 8C:
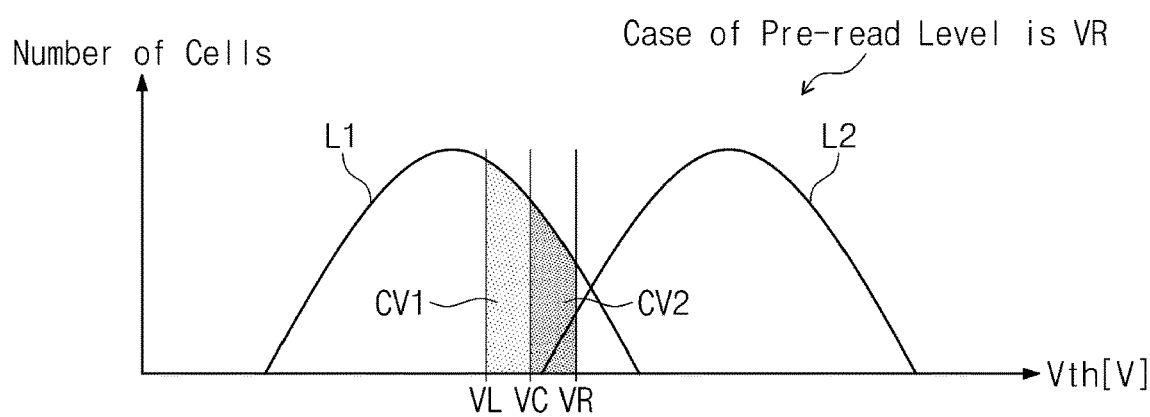
FIG. 8C is a graph describing an operation in which an OVS management module determines a third voltage level as a pre-read level, according to some embodiments of the present disclosure.

FIG. 8C is a graph describing an operation in which an OVS management module or circuit determines a third voltage level as a pre-read level, according to some embodiments of the present disclosure. The first count value CV1 and the second count value CV2 are illustrated in FIG. 8C.

In a graph indicating a threshold voltage level distribution, a horizontal axis represents a threshold voltage level, and a vertical axis represents the number of memory cells. A first line L1 may correspond to memory cells that are not programmed in the write operation and have the erase state "E". A second line L2 may correspond to memory cells that are programmed to have the program state "P" in the write operation.

When the first count value CV1 is greater than the second count value CV2 (i.e., when CV1>CV2) and when the difference between the first count value CV1 and the second count value CV2 is greater than the first reference value RV1 (i.e., when |CV1−CV21>RV1), the OVS management module 111 may determine the third voltage level VR as the pre-read level.

Figure 9:
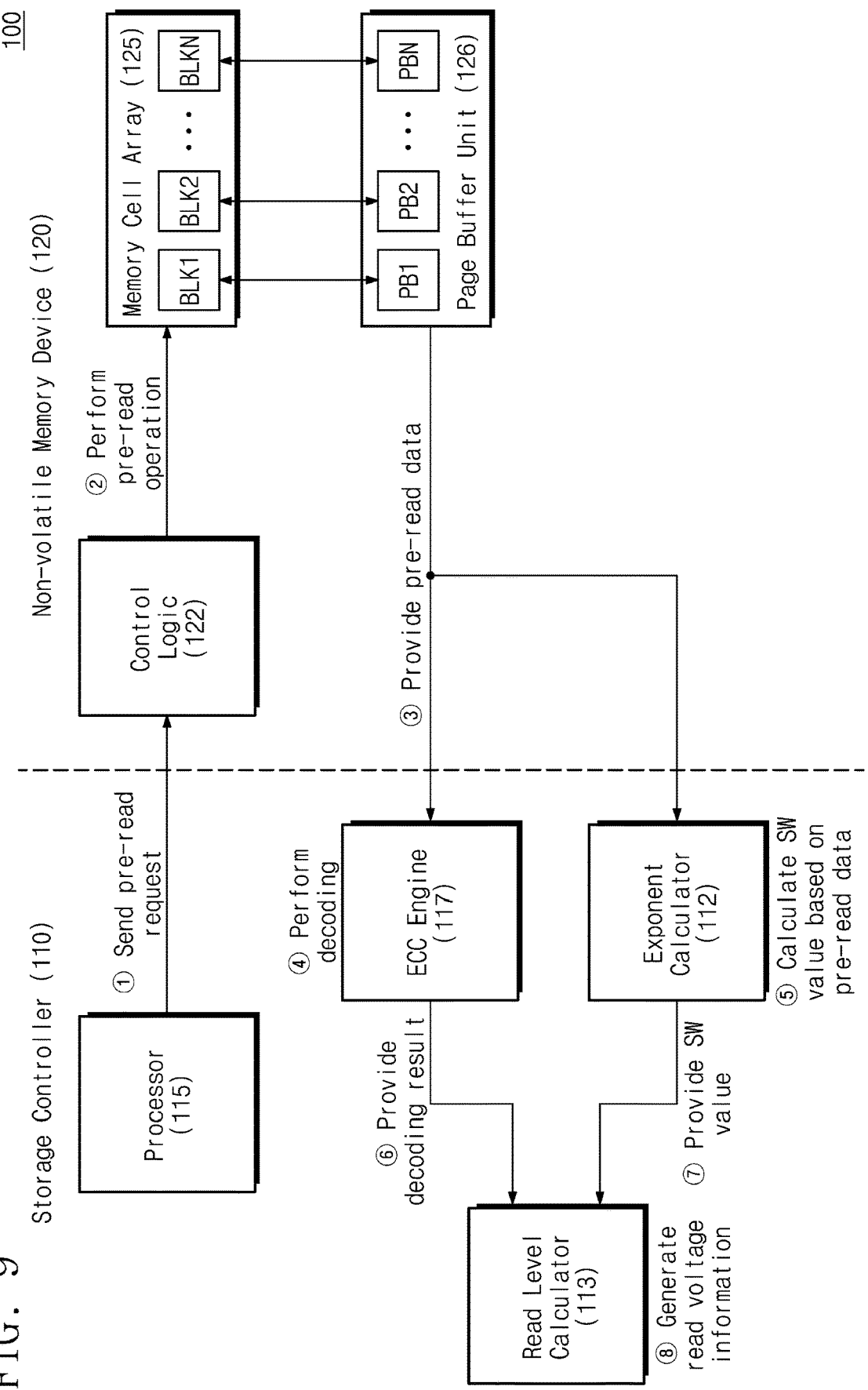
FIG. 9 is a diagram describing a pre-read operation of a storage device according to some embodiments of the present disclosure.

FIG. 9 is a diagram describing a pre-read operation of a storage device according to some embodiments of the present disclosure. Referring to FIG. 9, the storage device 100 may include the storage controller 110 and the non-volatile memory device 120.

The storage controller 110 may include the exponent calculator 112, the read level calculator 113, the ECC engine 117, and the processor 115. The exponent calculator 112, the read level calculator 113, the ECC engine 117, and the processor 115 may respectively correspond to the exponent calculator 112, the read level calculator 113, the ECC engine 117, and the processor 115 of FIG. 2.

The non-volatile memory device 120 may include the control logic 122, the memory cell array 125, and the page buffer unit 126. The control logic 122, the memory cell array 125, and the page buffer unit 126 may respectively correspond to the control logic 122, the memory cell array 125, and the page buffer unit 126 of FIG. 3.

Below, the pre-read operation of the storage device 100 according to some embodiments of the present disclosure will be described. For convenience of description and for brevity of drawing, unnecessary components are omitted.

In a first operation ①, the processor 115 may request the pre-read operation from the control logic 122. The pre-read operation may refer to an operation for reading data stored in the memory cell array 125 by using the pre-read level.

In a second operation ②, the control logic 122 may perform the read operation based on the command in the first operation ①. Under control of the control logic 122, data stored in the memory blocks BLK1 to BLKN of the memory cell array 125 may be provided to the page buffer unit 126 in units of page. The page buffers PB1 to PBN of the page buffer unit 126 may store the data of the memory blocks BLK1 to BLKN.

In a third operation ③, the page buffer unit 126 may provide the ECC engine 117 and the exponent calculator 112 with the pre-read data stored therein by the read operation in the second operation ②. An example in which the page buffer unit 126 substantially simultaneously provides the pre-read data to the ECC engine 117 and the exponent calculator 112 is illustrated, but the present disclosure is not limited thereto. For example, the page buffer unit 126 may provide the pre-read data to the ECC engine 117 and may then provide the pre-read data to the exponent calculator 112.

In a fourth operation ④, the ECC engine 117 may decode the pre-read data. In some embodiments, the ECC engine 117 may perform hard decision decoding on the pre-read data.

In a fifth operation ⑤, while the decoding operation according to the fourth operation ④ is performed, the exponent calculator 112 may calculate the SW value corresponding to the pre-read data. In some embodiments, the exponent calculator 112 may calculate the SW value with reference to Equation 1 below.

$$SW = w(rH^T)$$ [Equation 1]

Equation 1 above refers to an equation indicating the SW value. "SW" represents a syndrome weight (SW) value, w( ) represents a hamming weight function, "r" represents the pre-read data, and "H" represents a parity check matrix. The SW value may refer to a value for predicting an error level of the pre-read data. For example, as the SW value increases, the number of error bits included in the pre-read data may increase. As the SW value decreases, the number of error bits included in the pre-read data may decrease. This will be described in detail with reference to FIGS. 10A and 10B.

In a sixth operation ⑥, the ECC engine 117 may provide the read level calculator 113 with information indicating whether decoding succeeds. In a seventh operation ⑦, the exponent calculator 112 may provide the SW value to the read level calculator 113.

In an eighth operation ⑧, the read level calculator 113 may generate the read voltage information. In some embodiments, the read level calculator 113 may determine whether to generate the read voltage information, depending on a result of decoding the pre-read data. For example, when the decoding of the pre-read data succeeds, the read level calculator 113 may not generate the read voltage information. When the decoding of the pre-read data fails, the read level calculator 113 may generate the read voltage information based on the OVS count data OCD and the SW value.

In some embodiments, the read level calculator 113 may generate the read voltage information with reference to Equation 2 below.

$$RL_i = PRL + o_i^{(j)}$$ [Equation 2]

Equation 2 above refers to an equation indicating the read voltage information. $RL_i$ represents at least one of read levels of the read voltage information, "i" represents an index of a read level necessary for the k-bit read operation, and "i" may be a natural number of 1 or more or "$2^k-1$" or less (i.e., $1 \leq i \leq 2^k-1$). For example, in the 2-bit read operation, the read voltage information may include three read levels $RL_1$, $RL_2$, and $RL_3$. The first read level $RL_1$ may be lower than the second read level $RL_2$. The second read level $RL_2$ may be lower than the third read level $RL_3$. That is, as the index of the read level decreases, the read level may decrease. PRL represents the pre-read level. $o_i^{(j)}$ represents at least one of offsets in the offset set. "j" represents an index of the offset set. "j" may be a natural number of 1 or more and/or 12 or less. The offset set will be described in detail with reference to FIG. 11 together.

That is, referring to Equation 2 above, the read level calculator 113 may calculate at least one read level included in the read voltage information by adding at least one of the offsets of the offset set and the pre-read level.

Figure 10A:
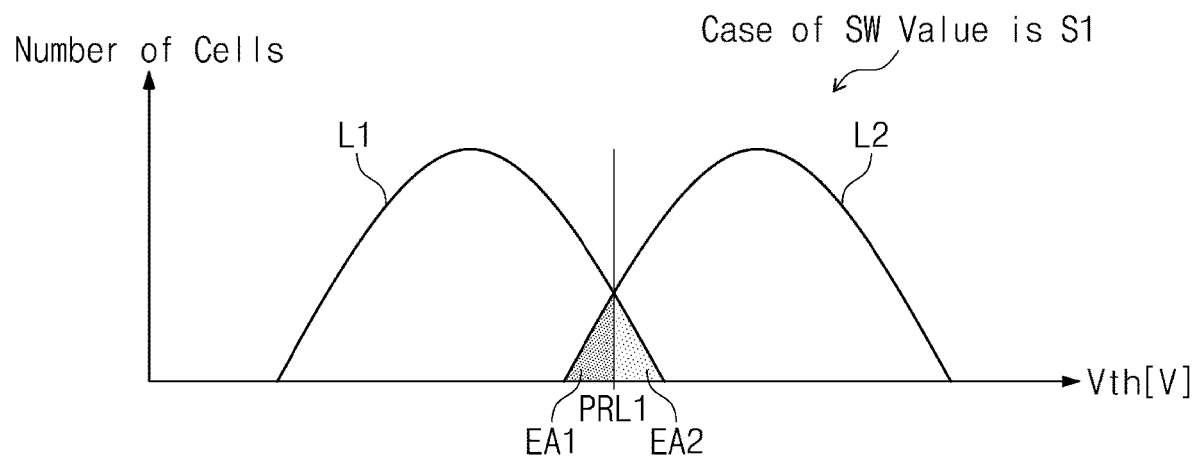
FIG. 10A is a graph describing a SW value according to some embodiments of the present disclosure.

FIG. 10A is a graph describing a SW value according to some embodiments of the present disclosure. A first area EA1 and a second area EA2 are illustrated in FIG. 10A. In a graph indicating a threshold voltage level distribution, a horizontal axis represents a threshold voltage level, and a vertical axis represents the number of memory cells.

Referring to FIGS. 9 and 10A, in the read operation, the non-volatile memory device 120 may perform the pre-read operation by using a first pre-read level PRL1. Memory cells whose threshold voltage levels are higher than the first pre-read level PRL1 may be turned off, and memory cells whose threshold voltage levels are lower than the first pre-read level PRL1 may be turned on.

The non-volatile memory device 120 may determine that the turned-on memory cell are in the erase state "E" and may determine that the turned-off memory cell are in the program state "P". The non-volatile memory device 120 may send the determined data to the storage controller 110.

As illustrated in FIG. 10A, some of the memory cells corresponding to the first line L1 may have threshold voltage levels higher than the first pre-read level PRL1. That is, memory cells corresponding to the second area EA2 from among memory cells intended to have the erase state "E" may be determined as having the program state "P".

Likewise, some of memory cells corresponding to the second line L2 may have threshold voltage levels lower than the first pre-read level PRL1. That is, memory cells corresponding to the first area EA1 from among memory cells intended to have the program state "P" may be determined as having the erase state "E".

The ECC engine 117 may attempt error correction decoding for the pre-read data in the first area EA1 and the pre-read data in the second area EA2 received from the non-volatile memory device 120. Data determined as having the program state "P" from among the data read from the memory cells corresponding to the first line L1 may be corrected to have the erase state "E" through the error correction decoding. Also, data determined as having the erase state "E" from among data read from the memory cells corresponding to the second line L2 may be corrected to have the program state "P" through the error correction decoding.

As described with reference to FIG. 10A, the read operation in which data are read from the memory cells of the states "E" and "P" and the error correction decoding is performed on the read data may refer to a hard decision-based read operation.

The exponent calculator 112 may calculate the SW value corresponding to the pre-read data through Equation 1 above. The SW value corresponding to the first area EA1 and the second area EA2 may be a first value S1.

Figure 10B:
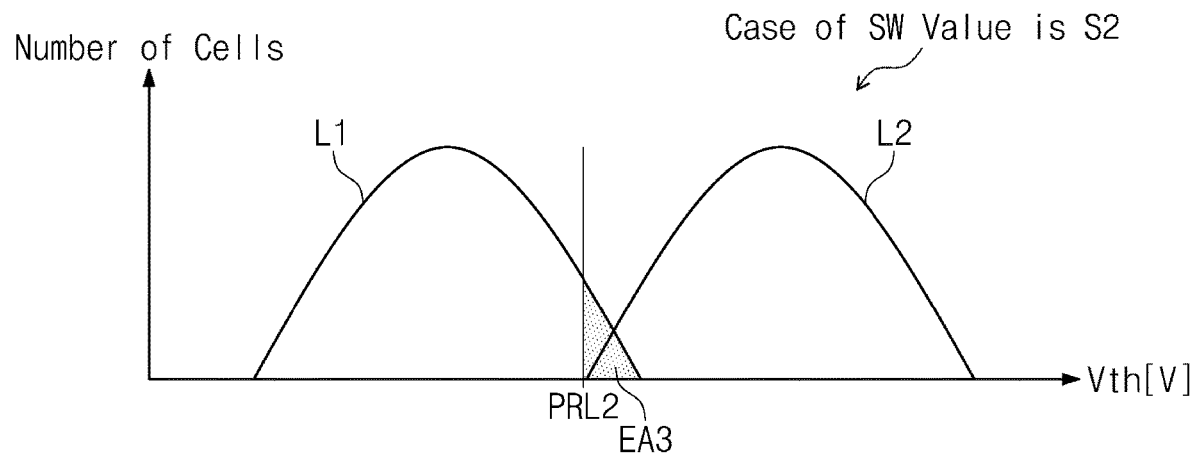
FIG. 10B is a graph describing a SW value according to some embodiments of the present disclosure.

FIG. 10B is a graph describing a SW value according to some embodiments of the present disclosure. A third area EA3 is illustrated in FIG. 10B.

Referring to FIGS. 9 and 10B, in the read operation, the non-volatile memory device 120 may perform the pre-read operation by using a second pre-read level PRL2. Memory cells whose threshold voltage levels are higher than the second pre-read level PRL2 may be turned off, and memory cells whose threshold voltage levels are lower than the second pre-read level PRL2 may be turned on.

The non-volatile memory device 120 may determine that the turned-on memory cell are in the erase state "E" and may determine that the turned-off memory cell are in the program state "P". The non-volatile memory device 120 may send the determined data to the storage controller 110.

As illustrated in FIG. 10B, some of the memory cells corresponding to the first line L1 may have threshold voltage levels higher than the second pre-read level PRL2. That is, memory cells corresponding to the third area EA3 from among memory cells intended to have the erase state "E" may be determined as having the program state "P".

The ECC engine 117 may attempt error correction decoding for the pre-read data received from the non-volatile memory device 120. Data determined as having the program state "P" from among the data read from the memory cells corresponding to the first line L1 may be corrected to have the erase state "E" through the error correction decoding.

As described with reference to FIG. 10B, the read operation in which data are read from the memory cells of the states "E" and "P" and the error correction decoding is performed on the read data may refer to a hard decision-based read operation.

The exponent calculator 112 may calculate the SW value for the pre-read data through Equation 1 above. The SW value corresponding to the third area EA3 may be a second value S2.

In FIG. 10B, in the case where there are no memory cells, whose threshold voltage levels are lower than the pre-read level PRL, from among the memory cells corresponding to the second line L2, memory cells intended to have the program state "P" may not include memory cells determined as having the erase state "E". That is, the number of error bits included in the read data read by using the second pre-read level PRL2 may be less than the number of error bits included in the read data read by using the first pre-read level PRL1 of FIG. 10A. Accordingly, the second value S2 may be smaller than the first value S1.

FIG. 11 is a table describing how to determine an offset, according to some embodiments of the present disclosure. Referring to FIGS. 2 and 11, a table OST describing an operation in which the read level calculator 113 determines the offset set is illustrated. The offset set may include offsets necessary to calculate a read level for the k-bit read operation. In some embodiments, values of the offsets illustrated in the table OST may be determined by the user.

For example, referring to the table OST, when the pre-read level is the first voltage level VL, when the first count value CV1 is smaller than the second count value CV2, and when a difference between the first count value CV1 and the second count value CV2 is greater than a second reference value RV2, and when a SW value SW is smaller than a third reference value RV3, the offset set necessary to calculate the read level for the k-bit read operation may be a first offset set $o_i^{(1)} \sim o_{2^k-1}^{(1)}$ (i.e., the index "j" of the offset set may be "1"). The second reference value RV2 and the third reference value RV3 may be used to determine the offset set. In some embodiments, the second reference value RV2 and the third reference value RV3 may be determined by the user.

In this case, to generate the read voltage information for the 2-bit read operation, the read level calculator 113 may calculate the first read level $RL_1$ by adding the pre-read level PRL and the first offset $o_1^{(1)}$, may calculate the second read level $RL_2$ by adding the pre-read level PRL and the second offset $o_2^{(1)}$, and may calculate the third read level $RL_3$ by adding the pre-read level PRL and the third offset $o_3^{(1)}$.

For another example, when the pre-read level is the third voltage level VR, when the first count value CV1 is greater than the second count value CV2, and when the difference between the first count value CV1 and the second count value CV2 is greater than the second reference value RV2, and when the SW value SW is smaller than the third reference value RV3, the offset set necessary to calculate the read level for the k-bit read operation may be a ninth offset set $o_i^{(9)} \sim o_{2^k-1}^{(9)}$ (i.e., the index "j" of the offset set may be "9").

In this case, to generate the read voltage information for the 2-bit read operation, the read level calculator 113 may calculate the first read level $RL_1$ by adding the pre-read level PRL and the first offset $o_1^{(9)}$, may calculate the second read level $RL_2$ by adding the pre-read level PRL and the second offset $o_2^{(9)}$, and may calculate the third read level $RL_3$ by adding the pre-read level PRL and the third offset $o_3^{(9)}$.

Figure 12:
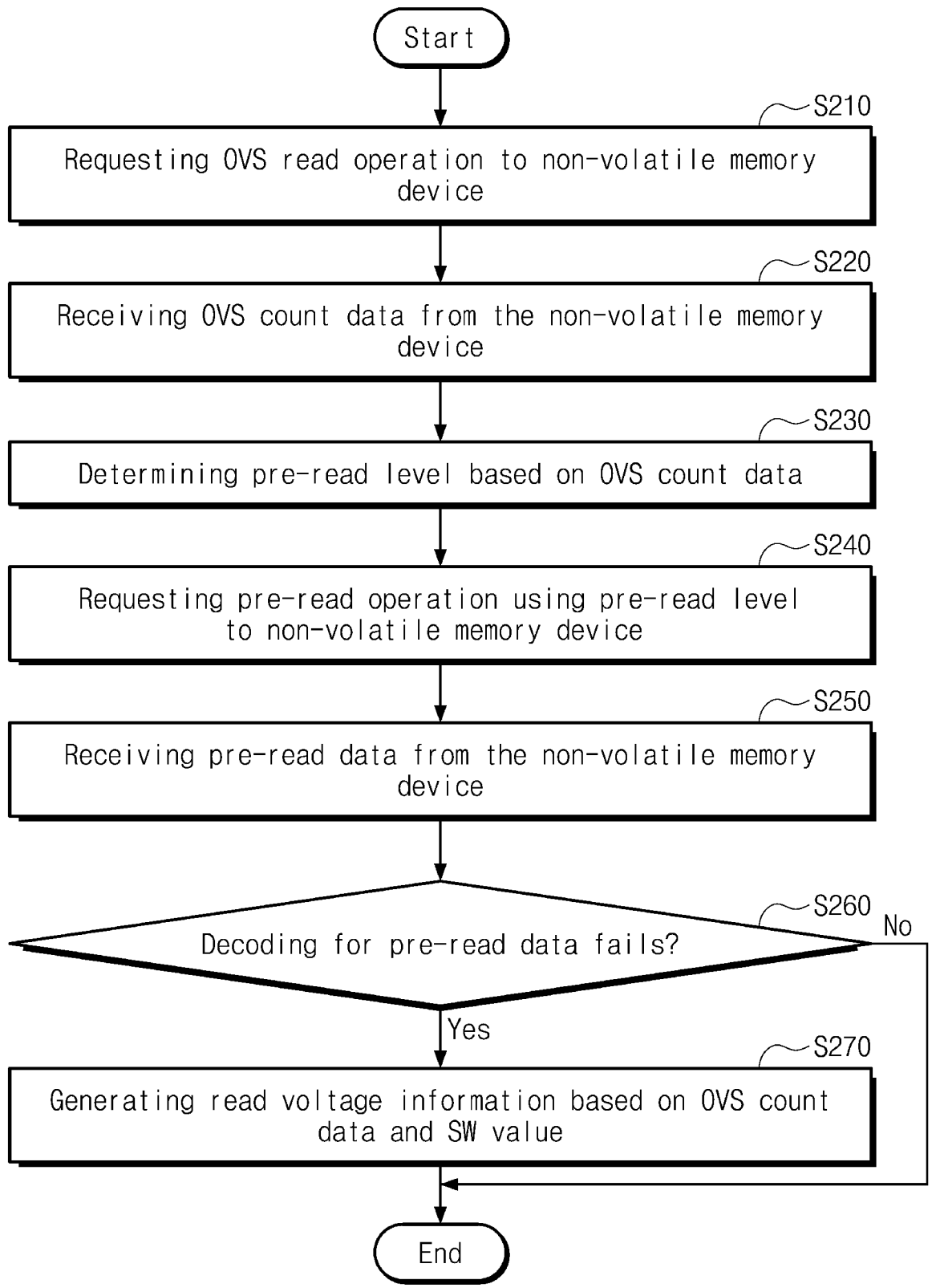
FIG. 12 is a flowchart describing an operating method of a storage controller according to some embodiments of the present disclosure.

FIG. 12 is a flowchart describing an operating method of a storage controller according to some embodiments of the present disclosure. An operating method of the storage controller 110 will be described with reference to FIGS. 1 and 12.

In operation S210, the storage controller 110 may request the OVS read operation from the non-volatile memory device 120.

In operation S220, the storage controller 110 may receive the OVS count data from the non-volatile memory device 120. The OVS count data may include the first count value CV1 and the second count value CV2.

In operation S230, the storage controller 110 may determine at least one of the first to third voltage levels as the pre-read level based on the OVS count data.

In operation S240, the storage controller 110 may request the pre-read operation, which is based on the pre-read level, from the non-volatile memory device 120.

In operation S250, the storage controller 110 may receive the pre-read data from the non-volatile memory device 120. The pre-read data may refer to data read from the non-volatile memory device 120 based on the pre-read level.

In operation S260, the storage controller 110 may decode the pre-read data. In some embodiments, the storage controller 110 may calculate the SW value corresponding to the pre-read data while the pre-read data are decoded.

When the decoding for the pre-read data fails, the storage controller 110 may perform operation S270. When the decoding for the pre-read data succeeds, the storage controller 110 may not generate the read level for the following read operation.

In operation S270, the storage controller 110 may generate the read voltage information based on the OVS count data and the SW value. In some embodiments, the storage controller 110 may determine the offset set necessary to generate the read voltage information, based on the OVS count data and the SW value. The storage controller 110 may generate at least one read level belonging to the read voltage information by adding at least one of a plurality of offsets in the offset set and the pre-read level.

Figure 13:
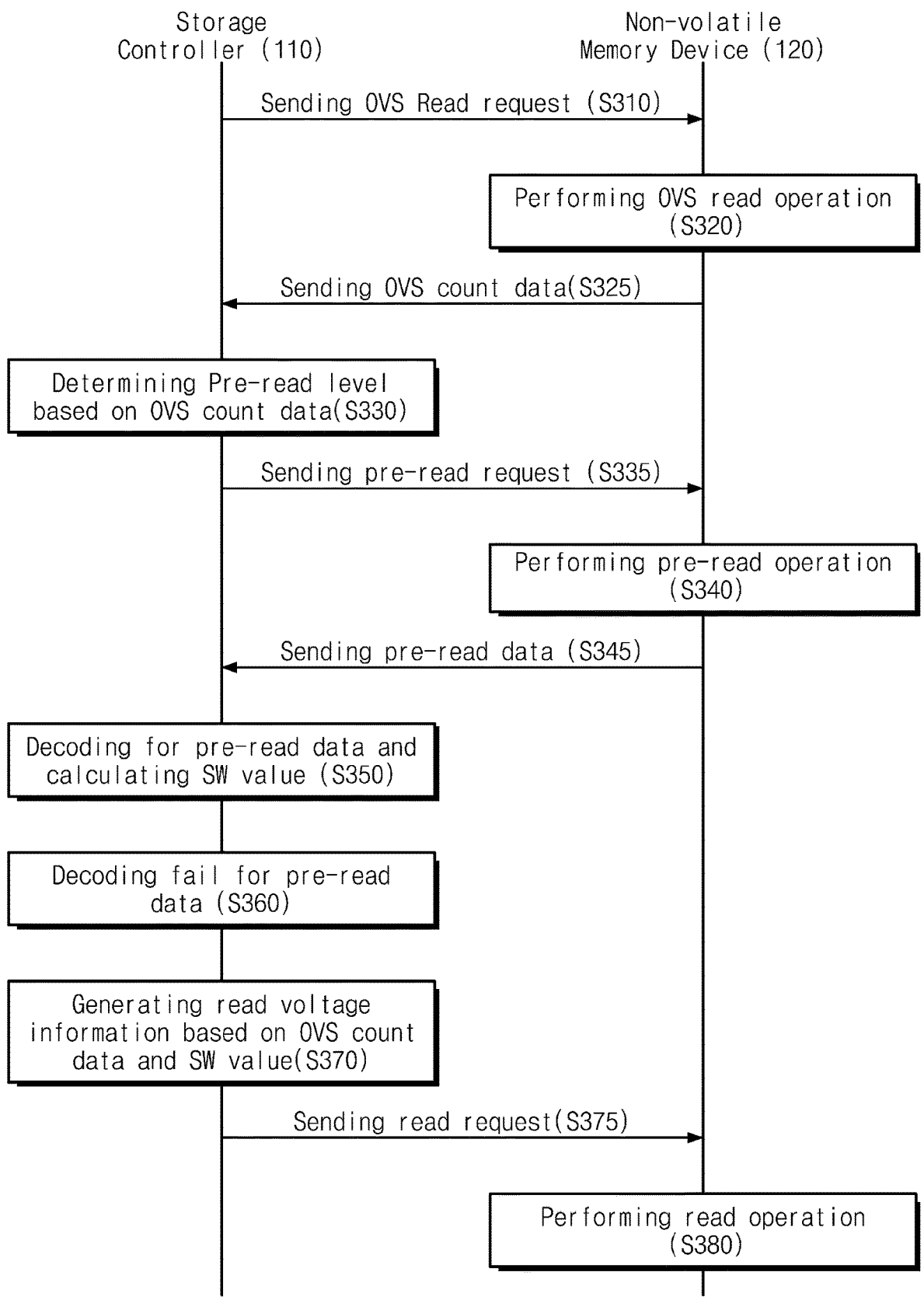
FIG. 13 is a flowchart illustrating an operating method of a storage device according to some embodiments of the present disclosure.

FIG. 13 is a flowchart illustrating an operating method of a storage device according to some embodiments of the present disclosure. An operating method of the storage device 100 will be described with reference to FIGS. 1 and 12.

In operation S310, the storage controller 110 may send the OVS read request to the non-volatile memory device 120.

In operation S320, the non-volatile memory device 120 may perform the OVS read operation. The non-volatile memory device 120 may generate the OVS count data including the first count value CV1 and the second count value CV2 through the OVS read operation.

In operation S325, the non-volatile memory device 120 may send the OVS count data to the storage controller 110.

In operation S330, the storage controller 110 may determine at least one of the first to third voltage levels as the pre-read level based on the OVS count data.

In operation S340, the non-volatile memory device 120 may perform the pre-read operation by using the pre-read level. In operation S345, the non-volatile memory device 120 may send the pre-read data to the storage controller 110.

In operation S350, the storage controller 110 may decode the pre-read data and may calculate the SW value corresponding to the pre-read data. In operation S360, the decoding for the pre-read data may fail.

In operation S370, the storage controller 110 may generate the read voltage information based on the OVS count data and the SW value. In some embodiments, the storage controller 110 may generate at least one read level belonging to the read voltage information by adding at least one of the plurality of offsets in the offset set and the pre-read level.

In operation S375, the storage controller 110 may send the read request to the non-volatile memory device 120. In operation S380, the non-volatile memory device 120 may perform the read operation by using the read voltage information.

When the hard decision fails, the soft decision may be performed to successfully read the data. A distance between read voltages used in the hard decision and read voltages used in the soft decision may be an offset. Conventional soft decision corresponds to soft decision in which a fixed offset is used. However, to increase the integrity of data and improve reliability of a storage device, the present inventive concepts are directed to calculating read levels for soft decision by adaptively adjusting offsets by using read levels used in hard decision and decoding information obtained in hard decision. According to some embodiments of the present disclosure, a storage controller may generate a read level for soft decision decoding based on read information and decoding information.

Also, the latency necessary to generate the read level may be minimized, and the storage controller may have improved reliability.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a storage controller that is configured to communicate with a non-volatile memory device, the method comprising:
   receiving count data from the non-volatile memory device;
   determining a pre-read voltage based on the count data;
   sending a pre-read request using the pre-read voltage to the non-volatile memory device;
   receiving pre-read data from the non-volatile memory device responsive to sending the pre-read request;
   calculating a decoding value corresponding to the pre-read data; and
   generating read voltage information based on the count data and the decoding value,
   wherein the decoding value is indicative of an error voltage of the pre-read data,
   wherein the count data are generated while the non-volatile memory device performs read operations by using a first voltage, a second voltage, and a third voltage,
   wherein the count data comprises a first count and a second count, and
   wherein the determining of the pre-read voltage based on the count data comprises:
     comparing the first count and the second count; and
     calculating a difference between the first count and the second count;
   when the first count is less than the second count based on a result of comparing the first count and the second count, comparing the difference and a first reference; and
   when the difference is greater than the first reference, setting the first voltage as the pre-read voltage.

2. The method of claim 1, further comprising:
   sending an OVS (On-chip Valley Search) read request to the non-volatile memory device, wherein the receiving of the count data from the non-volatile memory device comprises:
receiving the count data from the non-volatile memory device, responsive to sending the OVS read request.

3. The method of claim 1,
wherein the first count is obtained by counting a number of memory cells whose threshold voltages are between the first voltage and the second voltage, and
wherein the second count is obtained by counting a number of memory cells whose threshold voltages are between the second voltage and the third voltage.

4. The method of claim 1, further comprising:
when the first count is greater than the second count based on the result of comparing the first count and the second count, comparing the difference and the first reference;
when the difference is less than the first reference, setting the second voltage as the pre-read voltage; and
when the difference is greater than the first reference, setting the third voltage as the pre-read voltage.

5. The method of claim 1, wherein the calculating of the decoding value corresponding to the pre-read data comprises:
calculating the decoding value corresponding to the pre-read data by using a hamming weight function.

6. The method of claim 1, wherein, as the decoding value increases, a number of error bits of the pre-read data increases.

7. The method of claim 1, wherein the generating the read voltage information based on the count data and the decoding value comprises:
determining an offset set comprising a plurality of offsets based on the count data, the pre-read voltage, and the decoding value; and
generating one of a plurality of read voltages of the read voltage information by adding at least one of the plurality of offsets of the offset set and the pre-read voltage.

8. The method of claim 1, wherein the generating of the read voltage information based on the count data and the decoding value comprises:
performing hard decision decoding on the pre-read data;
determining whether the hard decision decoding fails; and
when the hard decision decoding fails, generating the read voltage information based on the count data and the decoding value.

9. The method of claim 8, wherein the performing of the hard decision decoding on the pre-read data comprises:
performing low density parity check (LDPC) decoding on the pre-read data.

10. The method of claim 1, further comprising:
sending a read request using the read voltage information to the non-volatile memory device;
receiving read data from the non-volatile memory device based on sending the read request; and
performing soft decision decoding based on the read data.

11. A storage controller comprising:
a cell count management circuit configured to determine a pre-read voltage based on count data received from a non-volatile memory device;
an exponent calculator circuit configured to calculate a decoding value corresponding to pre-read data that is read from the non-volatile memory device by using the pre-read voltage; and
a read voltage calculator circuit configured to generate read voltage information based on the count data received from the non-volatile memory device and the decoding value,
wherein the decoding value is indicative of an error voltage of the pre-read data,
wherein the count data comprises a first count and a second count,
wherein the count data are generated while the non-volatile memory device performs read operations by using a first voltage, a second voltage, and a third voltage, and
wherein the cell count management circuit is configured to perform operations comprising:
when the first count is less than the second count and when a difference between the first count and the second count is greater than a first reference, determining that the first voltage is the pre-read voltage;
when the first count is greater than the second count and when the difference between the first count and the second count is less than the first reference, determining that the second voltage is the pre-read voltage; and
when the first count is greater than the second count and when the difference between the first count and the second count is greater than the first reference, determining that the third voltage is the pre-read voltage.

12. The storage controller of claim 11,
wherein the first count is obtained by counting a number of memory cells whose threshold voltages are between the first voltage and the second voltage, and
wherein the second count is obtained by counting a number of memory cells whose threshold voltages are between the second voltage and the third voltage.

13. The storage controller of claim 11, wherein the exponent calculator circuit is further configured to perform operations comprising:
calculating the decoding value corresponding to the pre-read data by using a hamming weight function.

14. The storage controller of claim 11, wherein, as the decoding value increases, a number of error bits of the pre-read data increases.

15. The storage controller of claim 11, wherein the read voltage calculator circuit is further configured to perform operations comprising:
determining an offset set comprising a plurality of offsets based on the count data, the pre-read voltage, and the decoding value; and
generating one of a plurality of read voltages of the read voltage information by adding at least one of the plurality of offsets of the offset set and the pre-read voltage.

16. The storage controller of claim 11, further comprising:
an error correction code (ECC) engine,
wherein the ECC engine is configured to perform operations comprising:
performing hard decision decoding on the pre-read data; and
sending information indicating whether the hard decision decoding fails to the read voltage calculator circuit, and
wherein the read voltage calculator circuit is further configured to generate, when the hard decision decoding fails, the read voltage information based on the count data and the decoding value.

17. The storage controller of claim 16, wherein the hard decision decoding comprises low density parity check (LDPC) decoding.

18. A method of operating a storage device that comprises a non-volatile memory device and a storage controller, the method comprising:
generating count data, by the non-volatile memory device;

determining a pre-read voltage based on the count data, by the storage controller;

sending a pre-read request using the pre-read voltage to the non-volatile memory device, by the storage controller;

sending pre-read data read by the pre-read request to the storage controller, by the non-volatile memory device;

calculating a decoding value corresponding to the pre-read data, by the storage controller; and generating read voltage information based on the count data and the decoding value, by the storage controller, wherein the decoding value is indicative of an error voltage of the pre-read data, wherein the count data are generated while the non-volatile memory device performs read operations by using a first voltage, a second voltage, and a third voltage, wherein the count data comprises a first count and a second count, and wherein the determining of the pre-read voltage based on the count data comprises:
comparing the first count and the second count; and
calculating a difference between the first count and the second count;

when the first count is less than the second count based on a result of comparing the first count and the second count, comparing the difference and a first reference; and when the difference is greater than the first reference, setting the first voltage as the pre-read voltage.

\* \* \* \* \*